Patented Aug. 20, 1935

2,011,673

UNITED STATES PATENT OFFICE 2,011,673

PROCESS FOR THE MANUFACTURE OF NEW CONVERSION PRODUCTS FROM NATURAL RESINS AND ESTERS THEREOF

Josef Binapfl, Crefeld, Germany, assignor to I. G. Farbenindustrie Aktiengesellschaft, Frankfort-on-the-Main, Germany No Drawing. Application March 24, 1932, Serial No. 601,039. In Germany April 4, 1931

16 Claims. (Cl. 134—26)

The present invention concerns the manufacture of new and useful materials from acid natural resins or esters thereof and consists in causing certain volatile, halogen-containing substances to act on the same; the resulting new conversion products differ to a far reaching extent in their chemical and physical behaviour from the starting material. Instead of the acid resins or esters thereof the resin acids isolated from the same, or the esters of these resin acids can likewise be employed.

In particular, the new reaction products are distinguished from the starting materials by a much reduced iodine value, a higher molecular weight, a somewhat smaller acid value, and a higher softening point. Moreover they do not give the Storch-Morawski color reaction, that is to say, the addition of acetic anhydride and concentrated sulphuric acid does not produce the violet coloration characteristic of natural resins.

Among the acid natural resins and esters thereof, which are suitable for the manufacture of conversion products in accordance with the present invention, the following may be specially mentioned:—colophony, pine resin, Batavian damar, gum mastic, copal, as well as esters of these acid resins with ethyl alcohol, dodecyl alcohol, glycol, glycerine, mannite, phenol and the like. In addition the mixed esters, known under the name of alkyd resins and containing the residue of an acid from a natural resin besides the residue of a polyvalent alcohol and a polybasic acid, are well adapted for the manufacture of the new conversion products. As examples of the said alkyd resins may be mentioned the condensation products, obtainable from glycerine, glycol, poly glycols or poly glycerines, pentaerythrite, mannite, sorbite and the like by simultaneous or successive esterification with colophony, pine resin, copal, gum mastic, damar and the like and a polybasic acid, such as phthalic acid, trimellitic acid, succinic acid, maleic acid and the like.

The volatile, halogen-containing substances which are employed in accordance with my invention are boron fluoride and complex compounds of boron fluoride with organic acids, such as, for example, acetato-fluoro-boric acid, formiato-fluoro-boric acid, etc. These substances are preferably used in a practically anhydrous condition.

When employing solvents preferably those are found appropriate which in themselves do not undergo a chemical change under the reaction conditions, such as for example, carbon tetrachloride, carbon disulphide etc. Furthermore hydrocarbons, such as benzene, toluene, xylene, ligroin, gasoline, tetraline and the like are suitable as solvents for the purpose of this invention.

The temperature during the reaction may vary according to the conditions. I have obtained good results with temperatures above 0° C., more particularly with temperatures ranging from about 0° C. to about 250° C.

It is worth mentioning that the conversion products obtainable in accordance with the present invention by condensing acid natural resins by means of the above mentioned volatile, halogen-containing substances are capable of being esterified due to the presence of free carboxylic acid groups, e. g. by means of alcohols, such as for example, ethyl alcohol, glycol, glycerine, glycol monoethylether, polyglycol, mannite, sorbite, phenol etc.

The following examples will serve to illustrate the invention:

Example 1

28–29 parts by weight of boron fluoride are led into a mixture of 300 parts by weight of colophony (acid value 162, iodine value 170, saponification value 180, softening point 69° C., molecular weight 500) and 400 parts by weight of carbon tetrachloride during 33–35 hours at 10–11° C. with good stirring by means of a moderately fast current of nitrogen.

A dark brownish red viscous mass is gradually produced, which, after 50 hours, is freed from unaltered carbon tetrachloride by steam distillation. A yellowish residue is thus obtained, which is repeatedly washed with water and after melting yields a completely clear, honey-yellow resin possessing the following constants:

Acid value _____ 126
Iodine value _____ 52.3
Saponification value _____ 143
Softening point _____ 89° C.
Molecular weight _____ 680

Other solvents, such as carbon disulphide or hydrocarbons can be employed instead of carbon tetrachloride.

Example 2

300 parts by weight of Batavian damar (acid value 30.8, saponification value 46.3, iodine value 53.6, acetyl value 54, softening point 72–83° C.) are dissolved in 150 parts by weight of benzene. About 40 parts by weight of boron fluoride are added to this mixture with good cooling. After about 60 hours the resulting addition compound is decomposed by means of water and the solvent then removed by steam. The resin is washed again and then melted. A dark yellow resin possessing the following constants is thus obtained:

| | |
|---|---|
| Acid value | 27.4 |
| Saponification value | 42 |
| Iodine value | 38.7 |
| Acetyl value | 36 |
| Softening point | 128–130° C. |

Example 3

About 27 parts by weight of gaseous boron fluoride are passed with good stirring at 10–20° C. into a solution of 280 parts by weight of gum mastic (acid value 56.3, saponification value 93.1, iodine value 45.5, acetyl value 49.8, softening point 62–64° C.) in 200 parts by weight of benzene. After about 60 hours the resulting addition compound is decomposed with water and the solvent then removed by means of steam. After again washing the resin is melted. A dark yellow resin possessing the following constants is obtained:

| | |
|---|---|
| Acid value | 39.7 |
| Saponification value | 74.3 |
| Iodine value | 26.3 |
| Acetyl value | 20.2 |
| Softening point | 98–101° C. |

Example 4

300 parts by weight of colophony are dissolved in 150 parts by weight of benzene. About 48 parts by weight of acetato-fluoro-boric acid are added to this solution during 3 hours at 45–50° C. After about 12 hours the solution is diluted with 200 parts by weight of benzene; then 240 parts by weight of calcium oxide are added. The mixture thus obtained is stirred for about 20 minutes. After filtering the mixture the solvent is distilled off. 290 parts by weight of a clear, bright, yellow resin are obtained, possessing the following constants:

| | |
|---|---|
| Acid value | 129 |
| Iodine value | 64 |
| Softening point | 94–95° C. |

Example 5

10 parts by weight of boron fluoride are introduced in the course of 11 hours at about 55° C. with vigorous stirring into a solution of 300 parts by weight of colophony glycerine ester (acid value 20, softening point 72° C.) in 150 parts by weight of benzene. Then 300 parts by weight of benzene, 40 parts by weight of calcium oxide and 30 parts by weight of fuller's earth are added. After stirring for about 1 hour the mixture is filtered and the solvent is distilled off under diminished pressure. 295 parts by weight of a bright clear resin possessing the following constants are obtained:

| | |
|---|---|
| Acid value | 18 |
| Softening point | 102–103° C. |

Example 6

10 parts by weight of boron fluoride contained in a 25% solution of boron fluoride in technical crude benzene are introduced at 20° C. in the course of 24 hours with vigorous stirring by means of a rapid current of nitrogen into a solution of 150 parts by weight of colophony glycerine ester (softening point 80° C., acid value 20, iodine value 120) in 50 parts by weight of solvent naphtha. A dark brownish red viscous mass is gradually produced, which after 30 hours is freed from the solvent naphtha by steam distillation. After melting a clear resin is obtained, which no longer gives the Storch-Morawski reaction. It possesses the following constants:

| | |
|---|---|
| Iodine value | 58 |
| Acid value | 36 |
| Softening point | 98–99° C. |

Example 7

300 parts by weight of a condensation product (softening point 98° C.) obtained from 640 parts by weight of colophony, 216 parts by weight of glycerine and 296 parts by weight of phthalic anhydride are dissolved in 300 parts by weight of benzene. About 40 parts by weight of boron fluoride are added to this solution, which becomes dark in color. After standing for about 50 hours at room temperature the reaction mass no longer gives the Storch-Morawski reaction. The solvent is blown off by means of steam and the resinous residue washed with water till the washings no longer show an acid reaction. After melting in a current of nitrogen a clear resin (softening point 110° C.) is obtained.

Example 8

20 parts by weight of boron fluoride are passed at 16–20° C. into a solution of 200 parts by weight of mastic glycerine ester (acid value 14.8, saponification value 110, iodine value 113, softening point 76–77° C.) in 200 parts by weight of benzene. After 60 hours the resulting reaction product is decomposed with water and washed. After melting a clear resin possessing the following constants is obtained:

| | |
|---|---|
| Acid value | 16.4 |
| Saponification value | 117 |
| Iodine value | 98.5 |
| Softening point | 113–114° C. |

Example 9

150 parts by weight of colophony glycol ester (acid value 27.3, saponification value 143, iodine value 125, acetyl value 15.7, softening point 49–50° C.) are dissolved in 150 parts by weight of benzene. About 15 parts of boron fluoride are passed into this solution at 10–20° C. After standing at room temperature for about 24 hours the reaction mass no longer gives the Storch-Morawski reaction. After washing and melting the resin formed possesses the following constants:

| | |
|---|---|
| Acid value | 28.8 |
| Saponification value | 115 |
| Acetyl value | 25 |
| Iodine value | 91 |
| Softening point | 78–82° C. |

I claim:
1. The process which comprises reacting with a volatile, halogen-containing substance of the group consisting of boron fluoride and complex compounds of boron fluoride with organic acids upon material selected from the group consisting of acid, natural resins and esters of acid, natural resins.

2. The process which comprises reacting with boron fluoride upon material selected from the group consisting of acid, natural resins and esters of acid, natural resins.

3. The process which comprises reacting with a volatile, halogen-containing substance of the group consisting of boron fluoride and complex compounds of boron fluoride with organic acids upon an acid, natural resin.

4. The process which comprises reacting with a volatile, halogen-containing substance of the group consisting of boron fluoride and complex compounds of boron fluoride with organic acids upon an acid, natural resin in the presence of a solvent therefor.

5. The process which comprises reacting with boron fluoride upon an acid, natural resin in the presence of a solvent therefor.

6. The process which comprises reacting with boron fluoride upon colophony in the presence of carbon tetrachloride at a temperature of about 10° C.

7. A conversion product of an acid, natural resin obtainable by reacting with a volatile, halogen-containing substance of the group consisting of boron fluoride and complex compounds of boron fluoride with organic acids upon an acid, natural resin.

8. A conversion product of an acid, natural resin obtainable by reacting with boron fluoride upon an acid, natural resin.

9. A conversion product of colophony obtainable by reacting with boron fluoride upon colophony in the presence of carbon tetrachloride at a temperature of about 10° C.

10. The process which comprises reacting with a volatile, halogen-containing substance of the group consisting of boron fluoride and complex compounds of boron fluoride with organic acids upon an ester of an acid, natural resin.

11. The process which comprises reacting with a volatile, halogen-containing substance of the group consisting of boron fluoride and complex compounds of boron fluoride with organic acids upon an ester of an acid, natural resin in the presence of a solvent therefor.

12. The process which comprises reacting with boron fluoride upon an ester of an acid, natural resin in the presence of a solvent therefor.

13. The process which comprises reacting with boron fluoride upon colophony glycerine ester in the presence of benzene at a temperature of about 55° C.

14. A conversion product of an ester of an acid, natural resin obtainable by reacting with a volatile, halogen-containing substance of the group consisting of boron fluoride and complex compounds of boron fluoride with organic acids upon an ester of an acid, natural resin.

15. A conversion product of an ester of an acid, natural resin obtainable by reacting with boron fluoride upon an ester of an acid, natural resin.

16. A conversion product of colophony glycerine ester obtainable by reacting with boron fluoride upon colophony glycerine ester in the presence of benzene at a temperature of about 55° C.

JOSEF BINAPFL.